United States Patent [19]

Raidel

[11] Patent Number: 5,240,280

[45] Date of Patent: Aug. 31, 1993

[54] SPLIT-TYPE STRADDLE BRACKET FOR CONNECTING A VEHICLE AXLE WITH A VEHICLE SUSPENSION SYSTEM

[76] Inventor: John E. Raidel, Rte. 9, Box 400-M, Springfield, Mo. 65804

[21] Appl. No.: 684,217

[22] Filed: Apr. 12, 1991

[51] Int. Cl.5 .................................................. B60G 9/00
[52] U.S. Cl. .......................................... 280/688; 280/717; 280/725; 180/905
[58] Field of Search ............... 280/713, 717, 688, 725; 180/905

[56] References Cited

U.S. PATENT DOCUMENTS

| Re. 30,308 | 6/1980 | Masser | 280/713 |
|---|---|---|---|
| 3,737,174 | 6/1973 | Hickman | 280/717 |
| 4,267,896 | 5/1981 | Hendriksen | 280/725 |
| 4,371,190 | 2/1983 | Vandenberg | 280/725 X |
| 4,699,399 | 10/1987 | Jable et al. | |

Primary Examiner—Richard A. Schacher
Attorney, Agent, or Firm—Rogers, Howell & Haferkamp

[57] ABSTRACT

A split-type axle bracket is provided that is secured to a vehicle axle housing and extends downward over opposite lateral sides of a vehicle suspension torque beam, equalizer beam, or compensator beam and bushing. The axle bracket is secured to opposite lateral ends of the beam bushing on opposite lateral sides of the beam by a pair of releasable clamps. The clamps are secured to the depending legs of the bracket over the opposite lateral ends of the beam bushing. The pair of clamps are easily disassembled from the depending legs of the bracket to remove the beam and bushing from its connection to the axle bracket.

13 Claims, 1 Drawing Sheet

SPLIT-TYPE STRADDLE BRACKET FOR CONNECTING A VEHICLE AXLE WITH A VEHICLE SUSPENSION SYSTEM

BACKGROUND OF THE INVENTION (1) Field of the Invention

The present invention relates to a bracket that connects a vehicle axle to a bushing of a vehicle suspension member. In particular, the present invention relates to a split-type straddle bracket that connects a vehicle axle to a bushing mounted on a vehicle suspension member by extending around opposite lateral sides of the suspension member and releasably clamping to opposite lateral ends of the bushing.

(2) Description of the Related Art

In vehicle suspension systems employing torque beams, equalizer beams or compensator beams, the beams are commonly connected to an axle of the vehicle by an axle seat assembly. The axle seat assembly is connected in some manner directly to the beam or is connected to a bushing mounted on the beam.

In prior art torque, equalizer or compensator beams having a bushing connection to an axle seat, the bushing is commonly press fit in a laterally extending hole through one end of the beam. The beam and mounted bushing are then inserted between opposite inboard and outboard sides of the axle seat, and a center hole of the bushing is aligned with coaxial holes formed through the inboard and outboard sides of the axle seat. With the coaxial holes of the axle seat aligned with the center hole of the bushing, a threaded bolt is then inserted through the aligned holes and a nut is screw threaded on the bolt to secure the beam to the axle seat. To disassemble the beam from the axle seat, the nut must first be removed from the bolt and the bolt removed from the aligned holes of the axle seat and the center hole of the beam bushing. The beam and bushing are then removed from between the sides of the axle seat.

When performing periodic maintenance of a vehicle's suspension system, it is often difficult to disassemble the above-described bushing connection between the suspension system beam and axle seat. Over extended periods of use of a vehicle's suspension system, the above-described component parts of the suspension system wear and become corroded, making their disassembly difficult. What is needed is an improved assembly for connecting a vehicle suspension system torque beam, equalizer beam, or compensator beam bushing to a vehicle axle that is easily assembled, and is easily disassembled even after extended periods of use of the suspension system.

SUMMARY OF THE INVENTION

The split-type straddle bracket of the present invention is provided in pairs that are secured to opposite lateral ends of a vehicle axle and are releasably assembled to beam bushings mounted on suspension members such as torque beams, equalizer beams or compensator beams of the vehicle's suspension system. The brackets are assembled to the suspension system in a manner that facilitates the disassembly of the beams and bushings from the brackets. The brackets are generally comprised of base portions and pairs of clamps that are releasably assembled to the base portions.

The base of each bracket is provided with a surface that is positioned against and secured to the vehicle axle. The configuration of the axle engaging surface is chosen to conform to the configuration of a lateral section of the vehicle axle to which the bracket is to be attached.

Two pairs of engagement arms extend vertically upward from the base. Each pair of arms is positioned at opposite lateral ends of the base, and each arm of the pairs of arms is positioned on an opposite longitudinal side of the axle engaging surface of the base. Interior surfaces of each of the four arms extend upward from the axle engaging surface and also serve as engagement surfaces that contact and are secured to the front and back surfaces of the vehicle axle.

A pair of legs extend vertically downward from the bracket base. Each leg of the pair of legs extends downward from an opposite lateral side of the axle engaging surface of the base. Bearing surfaces are provided on the remote distal ends of the pair of legs and screw threaded bolt holes are provided on the opposite sides of the bearing surfaces. The bearing surfaces are formed in a semi-circular shape and are dimensioned to receive the opposite lateral ends of a bushing mounted in the vehicle suspension torque beam, equalizer beam or compensator beam. The semi-circular bearing surfaces seat over about one-half of the circumferential surfaces at the opposite ends of the beam bushing.

The pair of releasable clamps are secured to the remote ends of the bracket legs. The clamps are secured over the opposite lateral ends of the beam bushing and releasably secure the bushing and beam on the legs of the bracket. Each clamp of the pair of clamps is also provided with a bearing surface having a semi-circular shape. The semi-circular clamp bearing surfaces are dimensioned to seat over about one-half of the circumferential surfaces at the opposite lateral ends of the beam bushing. Each clamp of the pair of clamps is also provided with a pair of holes. The pair of holes receive a pair of screw threaded studs that are inserted through the clamp holes and are screwed into the holes provided in the bearing surfaces of the bracket legs. A pair of nuts are then screw threaded over the ends of the studs projecting from the clamp holes to releasably secure the pair of clamps in position on the remote ends of the bracket legs and to secure the opposite lateral ends of the beam bushing on the bracket.

The releasable connection of the pair of clamps to the bearing surface ends of the bracket legs facilitates the quick assembly and disassembly of the vehicle suspension torque beam, equalizer beam, or compensator beam to the brackets and the vehicle axle. The clamp-up assembly arrangement of the brackets and clamps enables the torque beam, equalizer beam, or compensator beam bushing to be quickly assembled to the bracket and the vehicle axle, and also enables the quick disassembly of the beam bushing from the bracket even after prolonged periods of operation of the vehicle suspension system.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

Figure 2:
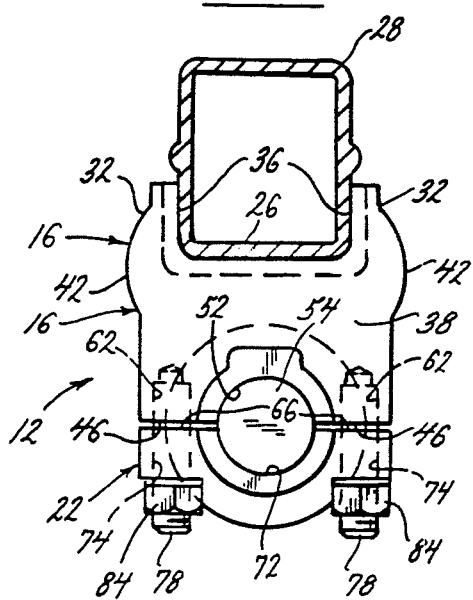
FIG. 2 is a side elevation view of the axle bracket taken along the line 2—2 of FIG. 1.
Figure 1:
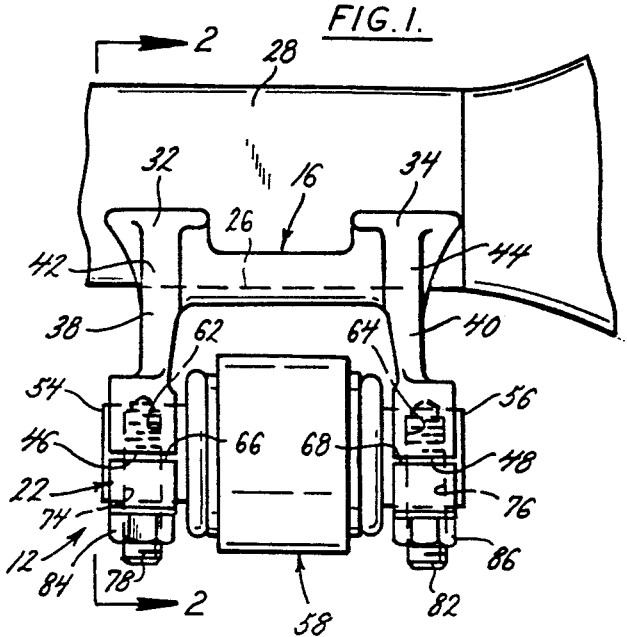
FIG. 1 is a front elevation view of the split-type axle bracket of the present invention secured along a portion of the lateral length of a vehicle axle.
Figure 3:
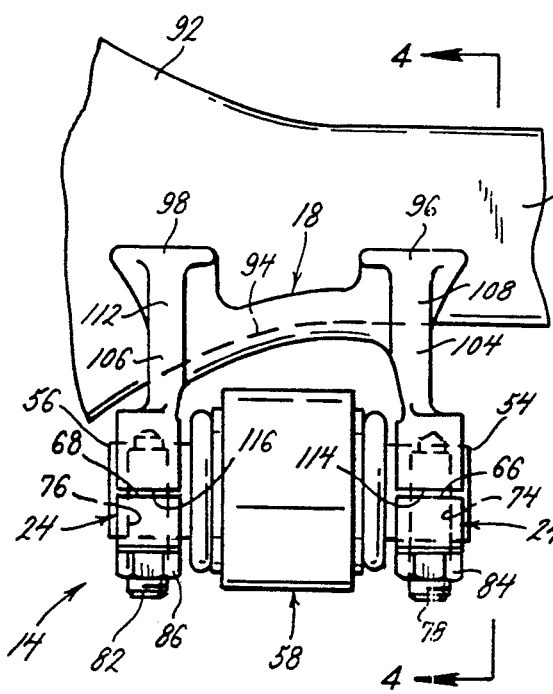
FIG. 3 is a front elevation view of a further embodiment of the axle bracket of the present invention secured to a portion of a vehicle axle and differential housing.
Figure 4:
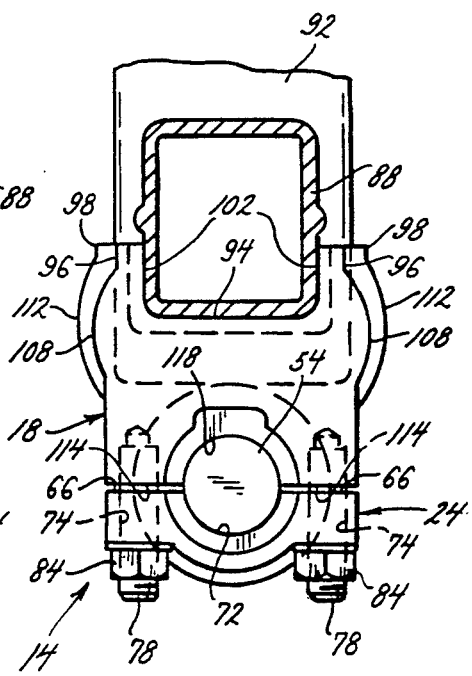
FIG. 4 is a side elevation view of the axle bracket of FIG. 3 taken along the line 4—4 of FIG. 3.

The split-type straddle bracket 12 of the present invention is shown in FIGS. 1 and 2 of the drawings. A variant embodiment of the split-type straddle bracket 14 of the present invention is shown in FIGS. 3 and 4 of the drawing figures. In both sets of drawing figures, only one bracket of the invention is shown. It should be understood that the split-type straddle bracket of the present invention is employed in pairs with one bracket of the pair being secured to opposite lateral ends of a vehicle axle. Although only one bracket is shown in FIGS. 1 and 2 secured to a substantially straight section of a vehicle axle housing, and only one bracket is shown in FIGS. 3 and 4 secured to a section of a vehicle axle housing that is formed unitarily with a section of the axle differential housing, in use a pair of brackets are employed at opposite ends of the vehicle axles. Both embodiments of the invention are designed to be employed in vehicle suspension systems having torque beams, equalizer beams, compensator beams, or any similar functioning types of beams. In both embodiments of the split-type straddle bracket 12, 14 each bracket is generally comprised of a base portion 16, 18 and pairs of clamps 22, 24 releasably assembled to the base portions.

The base portion 16 of the bracket shown in FIGS. 1 and 2 is provided with a substantially flat surface 26. The surface 26 is provided for engagement with the vehicle axle housing 28 along a bottom surface of the housing as seen in the drawing figures. The contour of the surface 26 is formed to substantially conform to the exterior surface of the axle housing 28 along the lateral portion of the axle housing to which the bracket 12 is to be secured.

Two pairs of engagement arms 32, 34 extend vertically upward from the bracket base 16 as seen in the drawing figures. Each of the pairs of arms 32, 34 are positioned at opposite lateral ends of the base 16. Each arm of a pair is positioned at opposite longitudinal ends of the base as is best seen in FIG. 2. Interior surfaces 36 of the engagement arms 32, 34 extend vertically upward from the axle engaging surface 26 of the base. In connecting the bracket 12 to the axle housing 28, the engagement arms 32, 34 are preferably welded to the axle housing.

A pair of legs 38, 40 depend vertically downward from the bracket base 16. Each leg of the pair of legs extends downward from an opposite lateral side of the base. Reinforcing webs 42, 44 are formed on the opposite longitudinal sides of the legs. The webs 42, 44 extend upward over the legs and the engagement arms 32, 34 directly opposite the legs. Each of the legs 38, 40 is formed with a distal end surface 46, 48 remote from the bracket base 16. A semi-circular bearing surface 52 is formed in each of the end surfaces 46, 48 of the bracket legs. The bearing surfaces 52 are dimensioned to seat over about one-half of the circumferential surfaces at the opposite lateral ends 54, 56 of a torque beam, equalizer beam, or compensator beam bushing 58 of a vehicle's suspension system. Screw threaded bolt holes 62, 64 extend into the bracket legs 38, 40 from the end surfaces 46, 48 of the legs. The bolt holes 62, 64 are positioned on opposite sides of the bearing surfaces 52 as is best seen in FIG. 2. As seen in FIG. 1, the lateral spacing of the pair of bracket legs 38, 40 enables the legs to extend around the opposite lateral sides of the vehicle suspension torque beam, equalizer beam, or compensator beam (not shown) and engage the opposite lateral ends 54, 56 of the beam bushing 58.

The pair of clamps 22 are releasably secured to the end surfaces 46, 48 of the bracket legs. The clamps 22 are secured to the bracket legs over the opposite lateral ends 54, 56 of the beam bushing 58. Each of the clamps 22 is provided with an end surface 66, 68 that matingly engages the end surfaces 46, 48 of the bracket legs 38, 40. Semi-circular bearing surfaces 72 are formed in the clamp end surfaces 66, 68. The clamp bearing surfaces 72 are dimensioned to seat over about one-half of the circumferential surfaces at the opposite lateral ends 54, 56 of the beam bushing 58. Each of the clamps 22 are also provided with pairs of bolt holes 74, 76 that extend through the clamps on opposite sides of the bearing surfaces 72. The pairs of holes 74, 76 receive pairs of screw threaded studs 78, 82 that are inserted through the clamp holes and are screwed into the bolt holes 62, 64 provided in the bracket legs 38, 40. A pair of hex nuts 84, 86 are screw threaded over the ends of the studs 78, 82 projecting from the clamp holes to releasably secure the pair of clamps 22 in position against the end surfaces 46, 48 of the bracket legs 38, 40 and over the opposite lateral ends 54, 56 of the beam bushing 58.

The releasable connection of the clamps 22 on the end surfaces 46, 48 of the bracket legs 38, 40 enables the quick connection of the opposite lateral ends 54, 56 of the beam bushing 58 to the legs of the bracket. The releasable connection provided by the studs 78, 82 and nuts 84, 86 also enables the quick disassembly of the clamps 22 from the bracket legs 38, 40 and the removal of the beam bushing 58 from the bracket.

FIGS. 3 and 4 show a variant embodiment of the split-type straddle bracket 14. This embodiment is only slightly different from the previously described embodiment and like component parts of the two embodiments of the bracket are given the same identifying reference numbers. For example, the clamps 22, studs 78, 82, and nuts 84, 86 are identical in both embodiments of the bracket. The suspension system beam bushing 58 is also identical in both described embodiments. The only difference between the two embodiments is in the construction of the bracket base 18.

As seen in FIGS. 3 and 4, the bracket base 18 differs from the previously described embodiment in that the base is formed to fit along the surface of the vehicle axle housing 88 as it merges into the axle differential housing 92. The bracket 18 is provided with a surface 94 that is curved to engage with the axle housing 88 as it merges into the differential housing 92. As seen in FIG. 3, the configuration of the engaging surface 94 conforms to the curvature of the axle housing 88 and the differential housing 92.

Two pairs of engagement arms 96, 98 extend vertically upward from the bracket base 18. Each of the pair of arms is positioned at opposite lateral ends of the base, and each arm of the pairs of arms is positioned on opposite longitudinal sides of the axle engaging surface 94 of the base. Interior surfaces 102 of each of the four arms 96, 98 extend upward from the axle engaging surface 94 of the base. The arm interior surfaces 102 also serve as engagement surfaces that contact the front and back surfaces of the axle housing 88 and differential housing 92. In connecting the bracket 14 to the vehicle axle, the engagement arms 96, 98 are preferably welded to the axle housing 88 and the differential housing 92.

A pair of legs 104, 106 extend vertically downward from the bracket base 18. Each leg of the pair of legs extends downward from an opposite lateral side of the axle engaging surface 94 of the base. Reinforcing webs 108, 112 are formed on the opposite longitudinal sides of each of the legs 104, 106 and extend vertically upward over the bracket legs 104, 106 and the bracket engagement arms 96, 98. Each of the bracket legs 104, 106 are formed with distal end surfaces 114, 116 remote from the bracket base 18. A semi-circular bearing surface 118 is formed in the end surfaces 114, 116. The semi-circular bearing surfaces 118 are dimensioned to seat over about one-half of the circumferential surfaces at the opposite lateral ends 54, 56 of the torque beam, equalizer beam, or compensator beam bushing 58.

The straddle bracket 14 of this embodiment is assembled to the vehicle axle and the vehicle suspension system beam bushing in substantially the same manner as the first described embodiment. The bracket is positioned on the vehicle axle housing 88 and differential housing 92 with the engaging surface 94 of the base and the interior surfaces 102 of the engagement arms engaging along lateral portions of the vehicle axle housing 88 and differential housing 92. The bracket is then secured to the axle and differential housings by welding or any other equivalent manner of securing the bracket to the housings. The suspension torque beam, equalizer beam, or compensator beam is then assembled to the bracket by engaging the opposite lateral ends 54, 56 of the beam bushing 58 against the bearing surfaces 118 of the bracket legs 104, 106, and then attaching the pair of clamps 22 to the legs 104, 106 over the bushing ends. The torque beam, equalizer beam, or compensator beam (not shown) and bushing 58 are disassembled from the bracket in the same manner as the first described embodiment.

While the present invention has been described by reference to specific embodiments, it should be understood that modifications and variations of the invention may be constructed without departing from the scope of the invention defined in the following claims.

I claim:

1. In a vehicle suspension system comprising a longitudinally extending torque beam having opposite lateral sides and a torque beam bushing with opposite lateral ends projecting from the opposite lateral sides of the torque beam, an axle bracket for connecting a laterally extending vehicle axle housing to the opposite lateral ends of the torque beam bushing, the axle bracket comprising:

a base configured to be secured to the axle housing;

a pair of legs extending from the base, each leg of the pair of legs extending from an opposite lateral side of the base to a distal end surface of the leg remote from the base, the end surface being configured to engage around a portion of one of the opposite lateral ends of the torque beam bushing; and, a pair of clamps, each clamp of the pair of clamps being connectable to a leg of the pair of legs with the opposite lateral ends of the torque beam bushing being secured between a clamp of the pair of clamps and an end surface of the pair of legs.

2. The axle bracket of claim 1, wherein:

each clamp of the pair of clamps is releasably connectable to each leg of the pair of legs.

3. The axle bracket of claim 1, wherein:

each end surface of the air of legs has a semi-circular bearing surface formed thereon, and each bearing surface is engagable around a portion of one of the opposite lateral ends of the torque beam bushing.

4. The axle bracket of claim 3, wherein:

each clamp of the pair of clamps has a semi-circular bearing surface formed thereon, and each clamp bearing surface is engagable around a portion of one of the opposite lateral ends of the torque beam bushing.

5. The axle bracket of claim 1, wherein:

each opposite lateral end of the torque beam bushing is releasably secured between a leg end surface and a clamp to enable the opposite lateral ends of the torque beam bushing to rotate between the leg end surfaces and the clamps.

6. In a vehicle suspension system employing a longitudinally extending torque beam having opposite lateral sides and a torque beam bushing with opposite lateral ends projecting from the opposite lateral sides of the torque beam, an axle bracket for connecting a laterally extending vehicle axle housing to the opposite lateral ends of the torque beam bushing, the axle bracket comprising:

a base securable to the axle housing;

a pair of laterally spaced legs extending from the base, each leg of the pair of legs being positionable over one of the opposite lateral sides of the torque beam and each leg of the pair of legs being engagable with one of the opposite lateral ends of the torque beam bushing; and a pair of clamps, each clamp of the pair of clamps being releasably connectable to a leg of the pair of legs positioned at the opposite lateral sides of the torque beam to releasably secure the opposite lateral ends of the torque beam bushing between a leg of the pair of legs and a clamp of the pair of clamps.

7. The axle bracket of claim 6, wherein:

each leg of the pair of legs and each clamp of the pair of clamps have a bearing surface formed thereon, the bearing surfaces being configured to engage over portions of the opposite lateral ends of the torque beam bushing.

8. The axle bracket of claim 6, wherein:

each opposite lateral end of the torque beam bushing is releasably secured between a leg of the pair of legs and a clamp of a pair of clamps to enable the opposite lateral ends of the torque beam bushing to rotate between the legs and clamps.

9. The axle bracket of claim 6, wherein:

each leg of the pair of legs has a semi-circular bearing surface formed thereon and each clamp of the pair of clamps has a semi-circular bearing surface formed thereon, and each leg bearing surface and each clamp bearing surface is engagable around a portion of one of the opposite lateral ends of the torque beam bushing.

10. In a vehicle suspension system employing a longitudinally extending torque beam having opposite lateral sides and a torque beam bushing with opposite lateral ends projecting from the opposite lateral sides of the torque beam, an axle bracket for connecting a laterally extending vehicle axle housing to the opposite lateral ends of the torque beam bushing, the axle bracket comprising:

a base having a surface configured to engage in surface contact with a portion of the vehicle axle housing;

a pair of legs extending vertically downward from the base, each leg of the pair of legs being laterally spaced on opposite sides of the base; and, a pair of clamps releasably secured to the pair of legs, each clamp of the pair of clamps being releasably secured to a leg of the pair of legs with one of the opposite lateral ends of the torque beam bushing secured therebetween to releasably attach the torque beam to the vehicle axle housing.

11. The axle bracket of claim 10, wherein:

each leg of the pair of legs and each clamp of the pair of clamps have a bearing surface formed thereon, the bearing surfaces being configured to engage over portions of the opposite lateral ends of the torque beam bushing.

12. The axle bracket of claim 10, wherein:

each opposite lateral end of the torque beam bushing is releasably secured between a leg of the pair of legs and a clamp of the pair of clamps to enable the opposite lateral ends of the torque beam bushing to rotate between the legs and clamps.

13. The axle bracket of claim 10, wherein:

each leg of the pair of legs has a semi-circular bearing surface formed thereon and each clamp of the pair of clamps has a semi-circular bearing surface formed thereon, and each leg bearing surface and each clamp bearing surface is engagable around a portion of one of the opposite lateral ends of the torque beam bushing.

* * * * *